(12) United States Patent
Hochgraf et al.

(10) Patent No.: US 7,968,240 B2
(45) Date of Patent: Jun. 28, 2011

(54) SYSTEM AND METHOD FOR SHORTING A FUEL CELL STACK

(75) Inventors: Clark G. Hochgraf, Honeoye Falls, NY (US); Robert S. Foley, Rochester, NY (US); Matthew K. Hortop, Rochester, NY (US); Balasubramanian Lakshmanan, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 818 days.

(21) Appl. No.: 12/014,272

(22) Filed: Jan. 15, 2008

(65) Prior Publication Data
US 2010/0003546 A1 Jan. 7, 2010

(51) Int. Cl.
*H01M 8/04* (2006.01)
*H01M 8/24* (2006.01)
*H01M 8/22* (2006.01)

(52) U.S. Cl. ......... 429/429; 429/432; 429/452; 429/505

(58) Field of Classification Search .................. 429/431, 429/429, 432, 442, 468, 506, 515, 452, 505; 363/56.04; 417/44.1
See application file for complete search history.

(56) References Cited

U.S. PATENT DOCUMENTS

| 4,546,423 A * | 10/1985 | Seki ........................... 363/56.04 |
| 2002/0076585 A1* | 6/2002 | Mund .............................. 429/17 |
| 2004/0219399 A1* | 11/2004 | Zhu et al. ......................... 429/13 |
| 2005/0233192 A1* | 10/2005 | Ishikawa et al. ................... 429/23 |
| 2006/0153687 A1* | 7/2006 | Ishikawa et al. ............. 417/44.1 |
| 2006/0188765 A1* | 8/2006 | Matsuzaki et al. .............. 429/23 |
| 2006/0280977 A1* | 12/2006 | Sakajo et al. .................... 429/23 |

* cited by examiner

*Primary Examiner* — Jonathan Crepeau
*Assistant Examiner* — Kenneth Douyette
(74) *Attorney, Agent, or Firm* — Fraser Clemens Martin & Miller LLC; J. Douglas Miller

(57) ABSTRACT

A fuel cell system is provided that includes a fuel cell stack with a plurality of fuel cells and a power converter in electrical communication with the fuel cell stack. The power converter is configured to selectively regulate a power of the fuel cell stack and short circuit the fuel cell stack, as desired. A method for starting the fuel cell stack is also described, including the steps of causing a short circuit of the fuel cell stack by placing the power converter in a short circuit mode; introducing a hydrogen to the anodes of the fuel cell stack to displace a quantity of air on the anodes; and placing the power converter in a power regulation mode. A degradation of the fuel cell stack during start-up is thereby militated against.

8 Claims, 4 Drawing Sheets

US 7,968,240 B2

SYSTEM AND METHOD FOR SHORTING A FUEL CELL STACK

FIELD OF THE INVENTION

The present disclosure relates to a fuel cell system and, more particularly, to a method for shorting a fuel cell stack in the fuel cell system during a start-up thereof.

BACKGROUND OF THE INVENTION

A fuel cell has been proposed as a clean, efficient and environmentally responsible power source for electric vehicles and various other applications. In particular, the fuel cell has been identified as a potential alternative for a traditional internal-combustion engine used in modern vehicles.

A common type of fuel cell is known as a proton exchange membrane (PEM) fuel cell. The PEM fuel cell includes three basic components: a cathode, an anode and an electrolyte membrane. The cathode and anode typically include a finely divided catalyst, such as platinum, supported on carbon particles and mixed with an ionomer. The electrolyte membrane is sandwiched between the cathode and the anode to form a membrane-electrode-assembly (MEA). The MEA is often disposed between porous diffusion media (DM) which facilitate a delivery of gaseous reactants, typically hydrogen and oxygen from air, for an electrochemical fuel cell reaction. Individual fuel cells can be stacked together in series to form a fuel cell stack. The fuel cell stack is capable of generating a quantity of electricity sufficient to power a vehicle.

During periods of non-operation, a quantity of air diffuses into the fuel cell stack and accumulates on the anodes. Upon a start-up operation of the fuel cell stack, hydrogen is supplied to the anodes. The fuel cell stack may be purged with hydrogen, for example, as disclosed in assignee's copending application Ser. No. 11/762,845, incorporated herein by reference in its entirety. The hydrogen displaces the accumulated air and creates a "hydrogen-air front" that travels along the anodes. The hydrogen-air front is known to degrade the fuel cells and impact fuel cell stack performance. In particular, the presence of both hydrogen and air on the anodes results in a localized electrical short between a portion of the anodes that have hydrogen and a portion of the anodes that have air. The localized electrical short causes a rapid corrosion of the carbon support on which the catalyst is disposed. The rate of carbon corrosion has been found to be proportional to a time that the hydrogen-air front exists and a magnitude of the localized voltage at the hydrogen-air front. The carbon corrosion reduces the useful life of the MEAs in the fuel cell stack.

It is known in the art to short circuit the fuel cell stack during the start-up operation to minimize the voltage generated by the hydrogen-air front. A typical system and method for shorting the fuel cell stack is disclosed in assignee's copending application Ser. No. 11/858,974, now U.S. Pat. No. 7,807,308, incorporated herein by reference in its entirety. In the typical shorting system, an electrical load is used to minimize the localized voltage during the start-up operation. However, such systems generally require additional system componentry and may be volumetrically difficult to package in an engine compartment of a vehicle.

There is a continuing need for a shorting system that is volumetrically efficient, less massive, and that employs existing componentry of the fuel cell system for shorting the fuel cell stack. Desirably, the shorting system enables a method that minimizes stack degradation by shorting the fuel cell stack during the start-up operation.

SUMMARY OF THE INVENTION

In concordance with the instant disclosure, a fuel cell system and method that is volumetrically efficient, less massive, and that employs existing componentry of the fuel cell system to short a fuel cell stack and minimize stack degradation, is surprisingly discovered.

In one embodiment, a fuel cell system includes a fuel cell stack in electrical communication with a power converter. The power converter is configured to selectively regulate a power of the fuel cell stack and short circuit the fuel cell stack as desired.

In another embodiment, a method for starting the fuel cell system includes the steps of: causing a short circuit of the fuel cell stack by placing the power converter in a short circuit mode; introducing a hydrogen to the anodes of the fuel cell stack to displace a quantity of air on the anodes; and placing the power converter in a power regulation mode. A degradation of the fuel cell stack during the start-up is thereby militated against.

In a further embodiment, the power converter is selected from one of an inverter adapted to convert a direct current (DC) from the fuel cell stack to an alternating current (AC) and a boost converter adapted to selectively translate a first voltage of the fuel cell stack to a second voltage. The short circuit mode includes one of a shoot-through fault of the inverter if the inverter is selected as the power converter and allowing a current to flow substantially uninterrupted through the boost converter if the boost converter is selected as the power converter. The power regulation mode includes one of operating the inverter to convert a direct current (DC) from the fuel cell stack to an alternating current (AC) if the inverter is selected as the power converter and operating the boost converter to translate a first voltage of the fuel cell stack to a second voltage if the boost converter is selected as the power converter.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
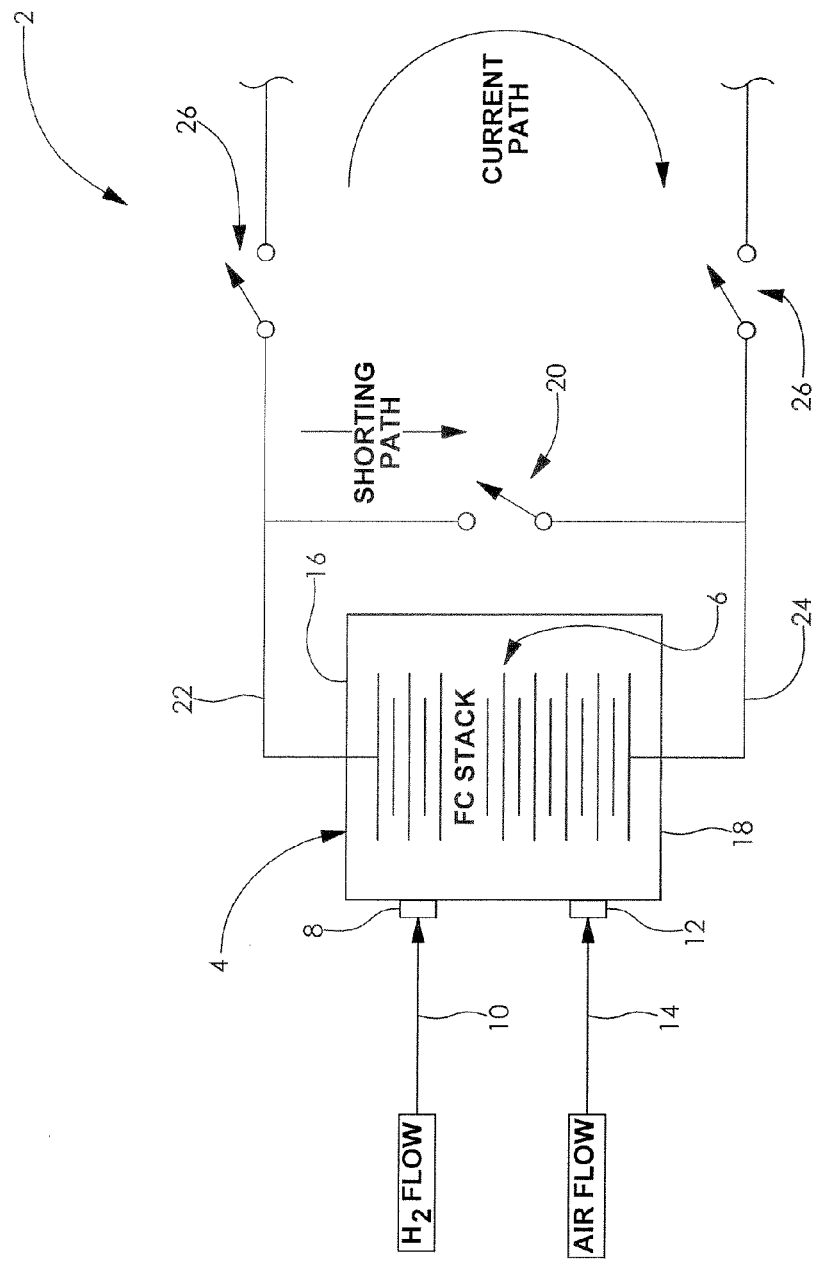
FIG. 1 is a schematic diagram an exemplary fuel cell system of the prior art, having a fuel cell stack and a shorting switch.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

FIG. 1 depicts a fuel cell system 2 of the prior art. The fuel cell system 2 includes a fuel cell stack 4 including a plurality of fuel cells 6. Each of the fuel cells has an anode and a cathode. The fuel cell stack 4 has an anode inlet 8 in fluid communication with the anodes adapted to deliver hydrogen 10 thereto. The fuel cell stack has a cathode inlet 12 in fluid communication with the cathodes adapted to deliver air 14 thereto. The hydrogen 10 and the air 14 are employed in an electrochemical fuel cell reaction in the fuel cell stack 4. The fuel cell stack 4 has a positive terminal 16 and a negative terminal 18.

A shorting switch 20 is provided in the fuel cell system 2 in electrical communication with the fuel cell stack 4. The shorting switch 20 is in electrical communication with the positive terminal 16 and the negative terminal 18. For example, the shorting switch 20 is in electrical communication with the terminals 16, 18 via a first high voltage bus line 22 and a second high voltage bus line 24, respectively. The shorting switch 20 is adapted to short circuit the fuel cell stack 4 as desired. As a nonlimiting example, the shorting switch 20 short circuits the fuel cell stack 4 during a start-up operation of the fuel cell stack 4.

The fuel cell system 2 may also include at least one additional switch 26 in electrical communication with the fuel cell stack 4. The additional switch 26 is adapted to selectively provide electrical current from the fuel cell stack 4 to at least one electrical load (not shown) such as an electric motor or another electrical component of an electric vehicle, for example. As nonlimiting examples, known electrical componentry includes air compressors, power converters, pumps, and heating and cooling devices.

Figure 2:
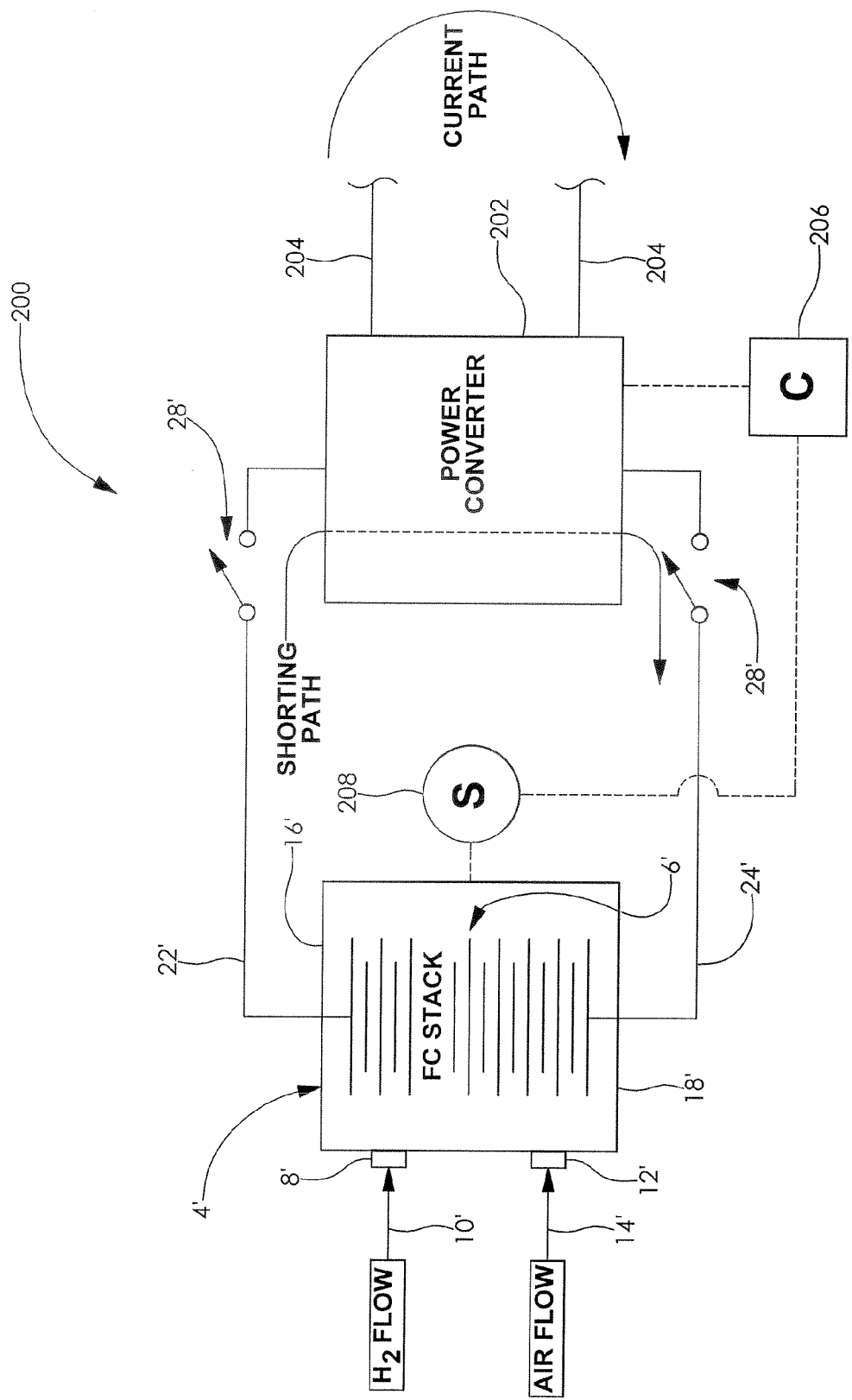
FIG. 2 is a schematic diagram of a fuel cell system according to an embodiment of the present disclosure, having a power converter adapted to short circuit the fuel cell stack as desired.
Figure 3:
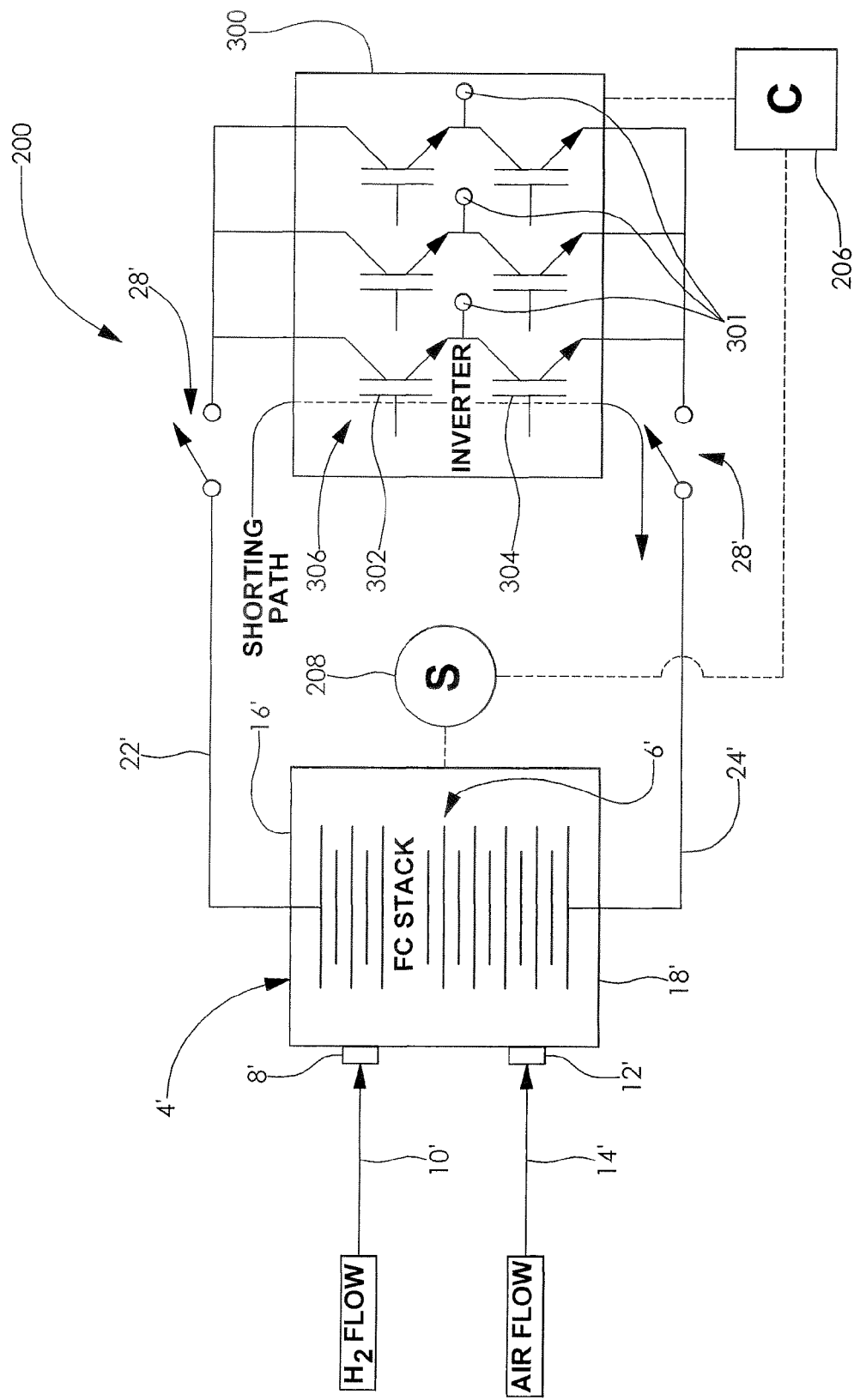
FIG. 3 is a schematic diagram of the fuel cell system according to FIG. 2, the power converter being an inverter.
Figure 4:
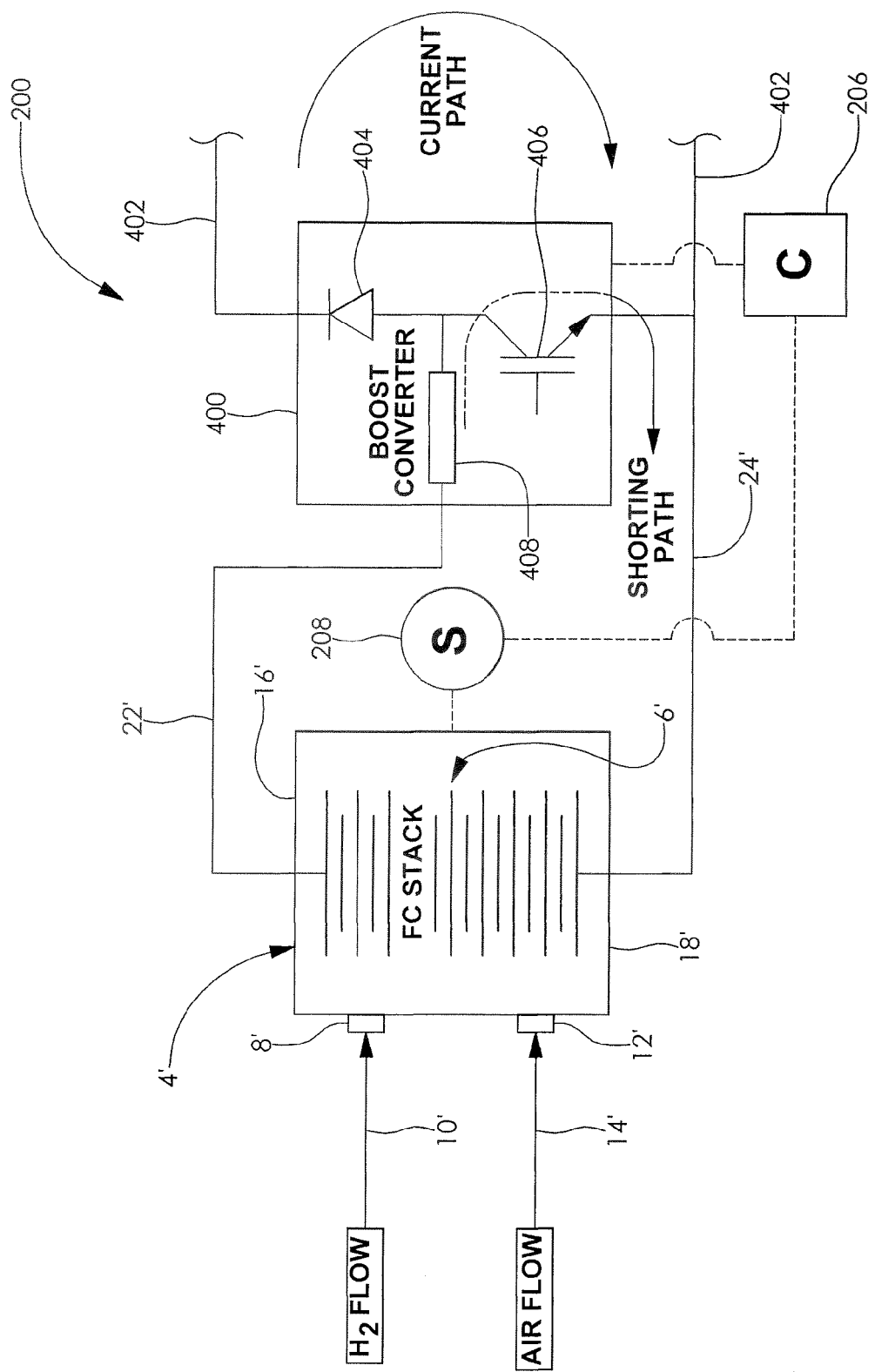
FIG. 4 is a schematic diagram of the fuel cell system according to FIG. 2, the power converter being a boost converter.

With reference to FIGS. 2 to 4, various embodiments according to the present invention are described. For purpose of clarity, like structures from FIG. 1 found in FIGS. 2 to 4 have the same reference numerals and are denoted with a prime (') symbol.

As shown in FIG. 2, a fuel cell system 200 includes the fuel cell stack 4' in electrical communication with a power converter 202. The fuel cell stack 4' receives the hydrogen 10' via the anode inlet 8' and the air 14' via the cathode inlet 12'. The positive and negative terminals 16', 18' of the fuel cell stack 4' are in electrical communication with the power converter 202 via the high voltages bus lines 22', 24'. The fuel cell system 200 may include the switches 28' in electrical communication with both the fuel cell stack 4' and the power converter 202. The switches 28' are adapted to selectively provide current from the fuel cell stack 4' to the power converter 202, as desired.

The power converter 202 of the present disclosure is configured to selectively regulate a power of the fuel cell stack 4' when in a normal or power regulation mode of operation. The power converter also provides the regulated power to the electrical load, for example, via electrical connections 204. As used herein, the term power converter includes any device that is configured to regulate or translate power from one form to another. Suitable examples of topologies for the power converter 202 include: an inverter for converting a direct current (DC) to an alternating current (AC); a rectifier for converting AC to DC; a voltage converter for translating a first voltage to a second voltage such as a boost converter adapted to translate a voltage input to a greater voltage output; and a frequency converter for converting an AC of a first frequency to a second frequency. It should be appreciated that other suitable power conversion topologies for regulating the power of the fuel cell stack 4' may be employed. The power converter 202 may be connected in series or in parallel with the fuel cell stack 4' and the electrical load, depending on the power conversion topology selected.

A skilled artisan should also understand that conventional power converters typically have controls, such as dead-time compensation or gate-signal interlocking, which militate against a short circuit or "shoot-through fault" and protect the conventional power converter. The power converter 202 of the present invention, however, is configured to selectively short circuit the fuel cell stack 4' when placed in a short circuit mode. As a nonlimiting example, the power converter 202 may include at least one transistor adapted to switch between an enabled or "on" state and a disabled or "off" state, thereby providing a path for a shorting current to flow therethrough.

The fuel cell system 200 of the disclosure may include a controller 206. The controller 206 is in electrical communication with the power converter 202 and adapted to selectively cause the power converter to short circuit the fuel cell stack 4'. The fuel cell system 200 may also include at least one sensor 208 configured to monitor the fuel cell stack 4'. As a nonlimiting example, the sensor 208 is a voltage sensor in electrical communication with the fuel cell stack 4' and adapted to measure a voltage thereof. The voltage sensor may further be in communication with the controller 206, and measurements of the fuel cell stack 4' voltage employed to control the power converter 202 mode of operation.

In the embodiment shown in FIG. 3, the power converter 202 is an inverter 300. The inverter 300 in the power regulation mode is adapted to convert a DC from the fuel cell stack 4' to an AC. The inverter 300 is in electrical communication with the electrical load, for example, via the load terminals 301. The inverter 300 may include a first transistor 302 and a second transistor 304 in a same inverter phase leg 306. The inverter 300 may include additional transistors and phase legs employed for conversion of DC to AC in the power regulation mode of the inverter 300. Although the inverter 300 shown in FIG. 3 is a three-phase inverter, other suitable inverters 300 may be used as desired.

A skilled artisan should understand that, when the inverter 300 is in the power regulation mode, the first transistor 302 and the second transistor 304 are operated in alternating opposition between the enabled state and the disabled state to convert DC from the fuel cell stack 4' to AC. The first and second transistors 302, 304 are rapidly switched back and forth in a coordinated manner known in the art to provide the desired AC output. The frequency of the switching may be above 10 kHz, for example. In particular embodiments, the frequency of the switching is about 20 kHz. Other suitable frequencies may be selected.

The first and second transistors 302, 304 are simultaneously enabled when the inverter 300 is placed in the short circuit mode. The shorting current is thereby allowed to flow substantially uninterrupted through the first and second transistors 302, 304 and short circuit the fuel cell stack 4'. The voltage of the fuel cell stack 4' during the short circuit is maintained at substantially zero.

Referring now to FIG. 4, the power converter 202 of the disclosure may be a boost converter 400. The boost converter is adapted to selectively translate a first voltage of the fuel cell stack 4' to a second voltage. For example, the boost converter 400 boosts a voltage input to a greater voltage output. A current at the second voltage is then provided to the electrical load via the load lines 402, for example.

In a particular embodiment, the boost converter 400 includes a diode 404, a boost transistor 406, and a resistor 408. Under a "normal" or power regulation mode of operation, the boost transistor 406 is rapidly switched between the enabled state and the disabled state, causing an increase in the output voltage as is known in the art. As a nonlimiting example, a switching rate of the boost transistor 406 under normal operation is greater than about 10 kHz. In a particular example the switching rate is greater than about 20 kHz. Suitable switching rates may be selected as desired.

When the boost converter 400 is placed in the short circuit mode to short circuit the fuel cell stack 4', the boost transistor 406 remains switched to the enabled state. The shorting current is thereby allowed to flow substantially uninterrupted through the boost transistor 406 and short circuit the fuel cell stack 4'. The voltage of the fuel cell stack 4' during the short circuit is maintained at substantially zero.

The present disclosure includes a method for starting the fuel cell stack 4' that militates against a degradation of the fuel cell stack 4' due to a hydrogen-air front. The method first includes the step of providing the fuel cell stack 4' in electrical communication with the power converter 202 as described herein. The short circuit of the fuel cell stack 4' is then caused by placing the power converter 202 in the short circuit mode. The hydrogen 10' is supplied to the anodes of the fuel cell stack 4'. The hydrogen 10' displaces a quantity of air on the anodes, if present, and forms the hydrogen-air front that travels along the anodes. The power converter 202 is subsequently placed in the power regulation mode, wherein the power converter 202 regulates the power of the fuel cell stack 4'.

The step of causing the short circuit is typically conducted when the voltage of the fuel cell stack 4' is below a predetermined voltage limit. Causing the short circuit when the stack voltage is below the predetermined voltage limit militates against undesired effects that may impair the power converter's 202 ability to regulate the power of the fuel cell stack 4' in the power regulation mode. For example, the power converter 202 is placed in the short circuit mode prior to a supplying of the hydrogen 10' and air 14' to the fuel cell stack 4'. Thus, since the respective fuels are not present at the anodes and the cathodes of the fuel cell stack 4', the voltage is essentially zero. The short circuit mode may also be caused when the voltage of the fuel cell stack 4', as measured by the voltage sensor, is below the predetermined voltage limit. The predetermined voltage limit may be selected as desired to militate against the undesired effects on the power converter 202.

When the power converter 202 is the inverter 300 described herein, the step of causing the short circuit further includes the step of enabling the first transistor 302 and the second transistor 304. The first and second transistors 302, 304 may be enabled substantially simultaneously. Similarly, when the power converter 202 is the boost converter 400, the step of causing the short circuit includes the step of enabling the boost transistor 406. The shorting current is thereby allowed to flow substantially uninterrupted through the power converter 202, and short circuit the fuel cell stack 4'.

The step of placing the power converter 202 in the power regulation mode may be performed when the voltage of the fuel cell stack 4' is greater than the predetermined voltage limit. As a nonlimiting example, the power converter 202 may be placed in the power regulation mode when the hydrogen 10' has substantially filled the anodes of the fuel cell stack 4'. When the hydrogen 10' has substantially filled the anodes, the hydrogen-air front created by the introduction of the hydrogen 10' has passed and the accompanying degradation may no longer occur. The power converter 202 may then be switched from the short circuit mode, wherein a degradation of the fuel cell stack is militated against, to the power regulation mode.

It should be understood that the step of placing the power converter 202 in the power regulation mode, when the power converter 202 is the inverter 300, includes the step of operating the first and second transistors 302, 304 in alternating opposition between the enable state and the disabled state as is known in the art. The inverter is thereby able to convert DC from the fuel cell stack 4' to AC. Similarly, when the power converter 202 is the boost converter 400, the step of placing the power converter in the power regulation mode includes the step of operating the boost transistor between the enabled state and the disabled state. The first voltage of the fuel cell stack 4' is thereby translated to the greater second voltage. The regulated power from the fuel cell stack 4' may then be further supplied to the at least one electrical load as desired.

It is surprisingly found that the power converter 202, when modified to operate in the unconventional manner described herein, is employed to militate against degradation of the fuel cell stack 4' during the existence of the hydrogen-air front at start-up. As additional shorting equipment is not employed in the fuel cell system 200 and the method of the disclosure, and since power converters have been employed in fuel cell systems of the art, a mass and packaged volume of the fuel cell system may be minimized.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fuel cell system comprising:
   a fuel cell stack including a plurality of fuel cells;
   a positive high voltage stack bus in electrical communication with a positive terminal of the fuel cell stack, and a negative high voltage stack bus in electrical communication with a negative terminal of the fuel cell stack;
   an inverter in electrical communication with the fuel cell stack via the positive high voltage stack bus and the negative high voltage stack bus, the inverter configured to selectively regulate a power of the fuel cell stack and short circuit the fuel cell stack, wherein the inverter has a first transistor and a second transistor in an inverter phase leg, the inverter configured to convert a direct current (DC) from the fuel cell stack to an alternating current (AC) when regulating the power of the fuel cell stack;
   a voltage sensor in electrical communication with the fuel cell stack, the voltage sensor configured to measure a voltage of the fuel cell stack; and
   a controller in electrical communication with the inverter and the voltage sensor, the controller configured to selectively cause the inverter to short circuit the fuel cell stack when the voltage of the fuel cell stack as measured by the voltage sensor is below a predetermined voltage limit, the short circuit caused when the first transistor and the second transistor of the inverter are simultaneously enabled to allow a shoot-through fault and short circuit the fuel cell stack.

2. A start-up method for a fuel cell stack, the method comprising the steps of:
   providing a fuel cell system including the fuel cell stack, a positive high voltage stack bus in electrical communication with a positive terminal of the fuel cell stack, and a negative high voltage stack bus in electrical communication with a negative terminal of the fuel cell stack, an inverter in electrical communication with the fuel cell stack via the positive high voltage stack bus and the negative high voltage stack bus, the inverter configured to selectively regulate a power of the fuel cell stack and short circuit the fuel cell stack, wherein the inverter has a first transistor and a second transistor in an inverter phase leg, the inverter configured to convert a direct current (DC) from the fuel cell stack to an alternating current (AC) when regulating the power of the fuel cell stack, a voltage sensor in electrical communication with the fuel cell stack, the voltage sensor configured to measure a voltage of the fuel cell stack, and a controller in electrical communication with the inverter and the voltage sensor, the controller configured to selectively cause the inverter to short circuit the fuel cell stack when the voltage of the fuel cell stack as measured by the voltage sensor is below a predetermined voltage limit, the short circuit caused when the first transistor and the second transistor of the inverter are simultaneously enabled to allow a shoot-through fault and short circuit the fuel cell stack;

causing the short circuit of the fuel cell stack by placing the inverter in a short circuit mode, the short circuit mode simultaneously enabling the first transistor and the second transistor to allow a current to flow substantially uninterrupted therethrough;

introducing hydrogen to the anodes of the fuel cell stack to displace a quantity of air on the anodes; and placing the inverter in a power regulation mode, the power regulation mode operating the first transistor and the second transistor in alternating opposition between an enabled state and a disabled state to convert the direct current (DC) from the fuel cell stack to the alternating current (AC).

3. The method of claim 2, wherein the inverter is placed in the short circuit mode upon the introduction of the hydrogen to the anodes.

4. The method of claim 2, wherein the inverter is placed in the short circuit mode when a voltage of the fuel cell stack is substantially zero.

5. The method of claim 2, wherein the inverter is placed in the power regulation mode when the hydrogen has substantially filled the anodes of the fuel cell stack.

6. The method of claim 2, wherein the inverter is placed in the power regulation mode when the voltage of the fuel cell stack exceeds the predetermined voltage limit.

7. The method of claim 6, wherein the predetermined voltage limit is below a voltage that impairs an ability of the inverter to regulate the power for the fuel cell stack.

8. A start-up method for a fuel cell stack, the method comprising the steps of:

providing a fuel cell system including the fuel cell stack, a positive high voltage stack bus in electrical communication with a positive terminal of the fuel cell stack, and a negative high voltage stack bus in electrical communication with a negative terminal of the fuel cell stack, an inverter in electrical communication with the fuel cell stack via the positive high voltage stack bus and the negative high voltage stack bus, the inverter configured to selectively regulate a power of the fuel cell stack and short circuit the fuel cell stack, wherein the inverter has a first transistor and a second transistor in an inverter phase leg, the inverter configured to convert a direct current (DC) from the fuel cell stack to an alternating current (AC) when regulating the power of the fuel cell stack, a voltage sensor in electrical communication with the fuel cell stack, the voltage sensor configured to measure a voltage of the fuel cell stack, and a controller in electrical communication with the inverter and the voltage sensor, the controller configured to selectively cause the inverter to short circuit the fuel cell stack when the voltage of the fuel cell stack as measured by the voltage sensor is below a predetermined voltage limit, the short circuit caused when the first transistor and the second transistor of the inverter are simultaneously enabled to allow a shoot-through fault and short circuit the fuel cell stack;

measuring the voltage of the fuel cell stack with the voltage sensor;

causing the short circuit of the fuel cell stack by placing the inverter in a short circuit mode when the voltage of the fuel cell stack as measured by the voltage sensor is below the predetermined voltage limit, the short circuit mode simultaneously enabling the first transistor and the second transistor to allow a current to flow substantially uninterrupted therethrough, thereby providing a shoot-through fault of the inverter;

introducing hydrogen to the anodes of the fuel cell stack to displace a quantity of air on the anodes after the fuel cell stack is placed in the short circuit mode; and placing the inverter in a power regulation mode when the voltage as measured by the voltage sensor is above the predetermined voltage limit, the power regulation mode operating the inverter to convert the direct current (DC) from the fuel cell stack to the alternating current (AC), wherein a degradation of the fuel cell stack during the start-up is militated against.

* * * * *